Figure 1:
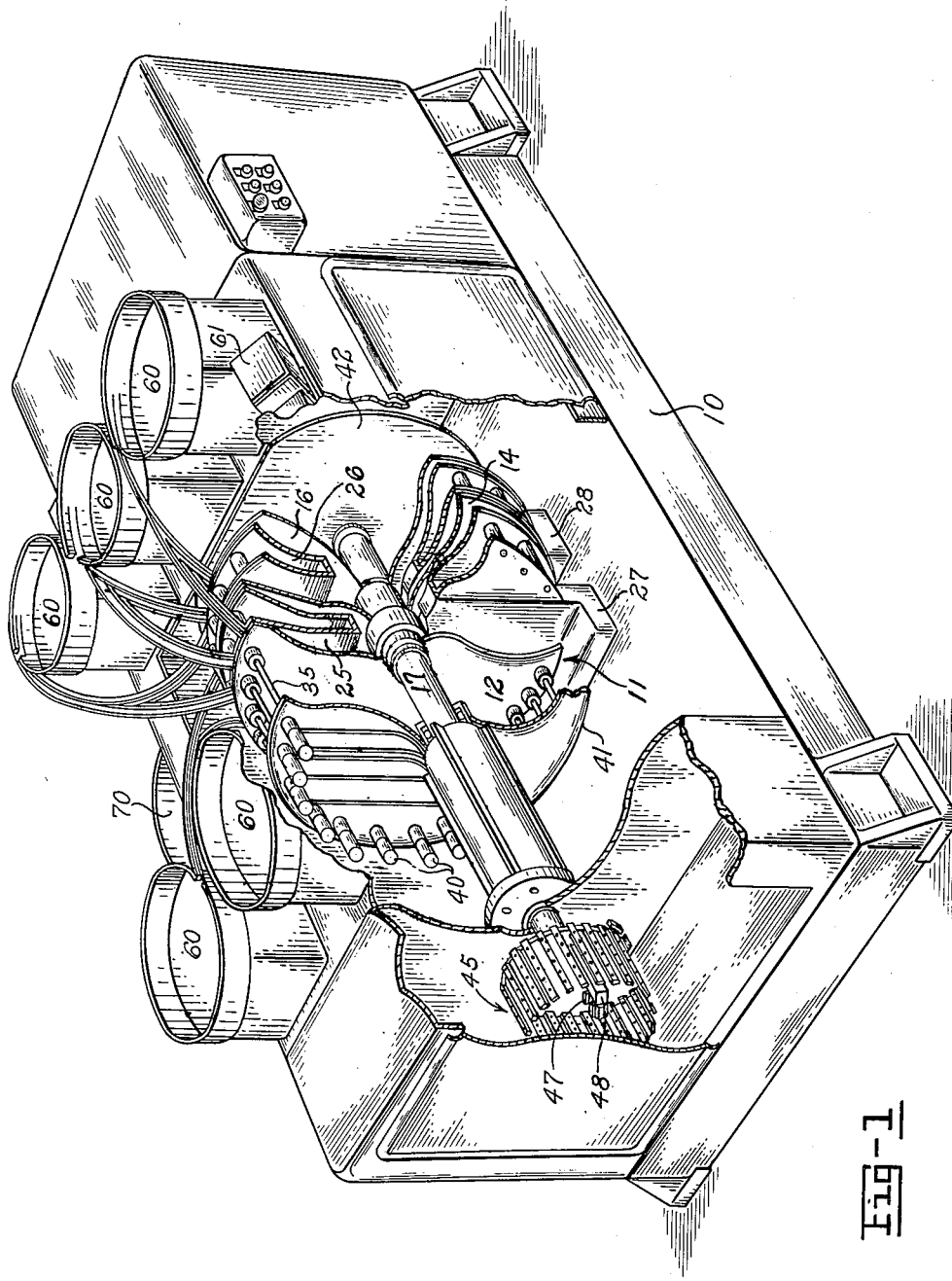

June 6, 1961  R. L. ESKEN  2,986,819
MACHINE FOR GAUGING, SELECTING AND ASSEMBLING PART COMPONENTS
Filed Nov. 19, 1954  8 Sheets-Sheet 1

INVENTOR.
BY R. L. Esken
Edward J. Noiz
atty.

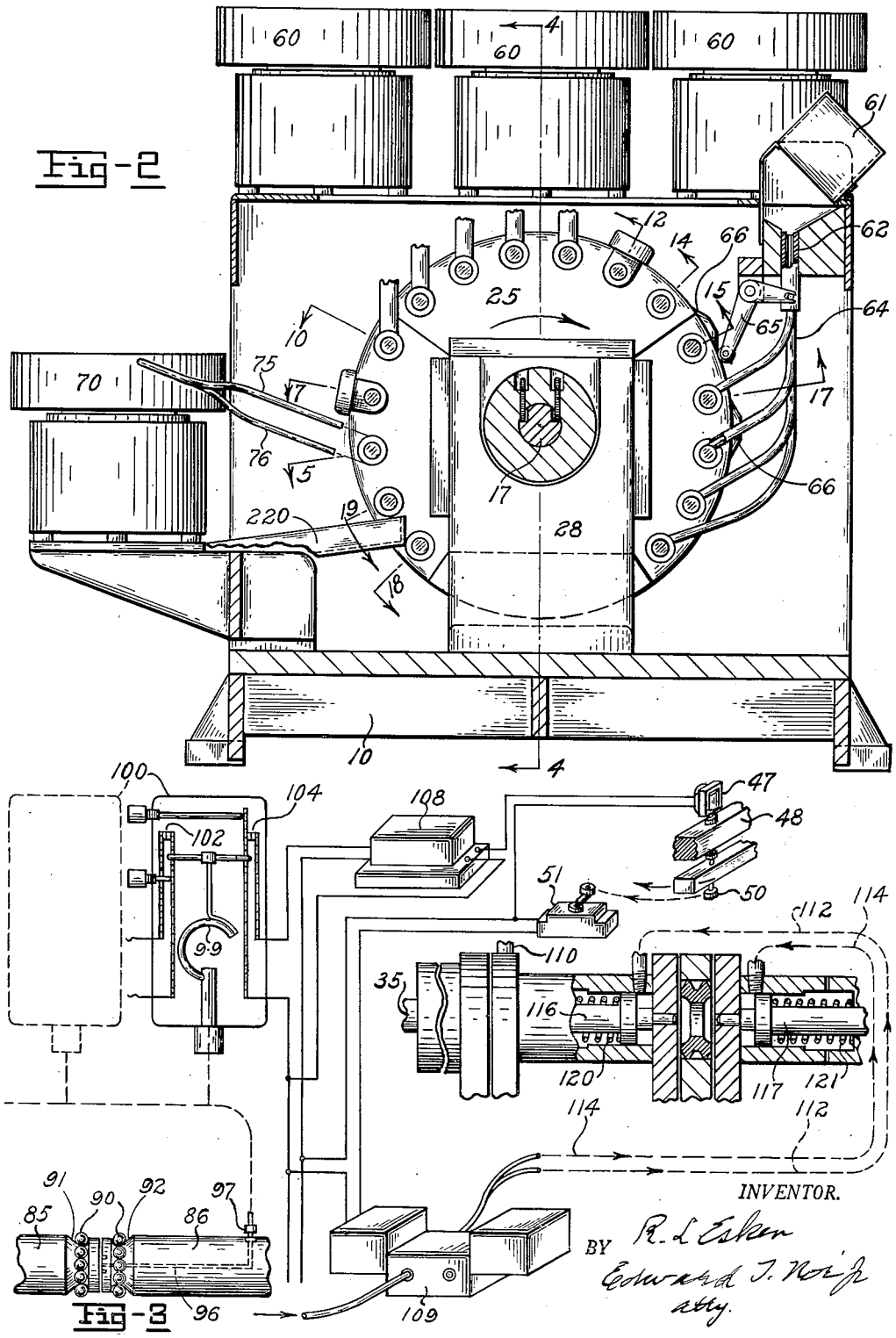

June 6, 1961 R. L. ESKEN 2,986,819
MACHINE FOR GAUGING, SELECTING AND ASSEMBLING PART COMPONENTS
Filed Nov. 19, 1954 8 Sheets-Sheet 3

INVENTOR.
R. L. Esken
BY Edward T. Noji
atty.

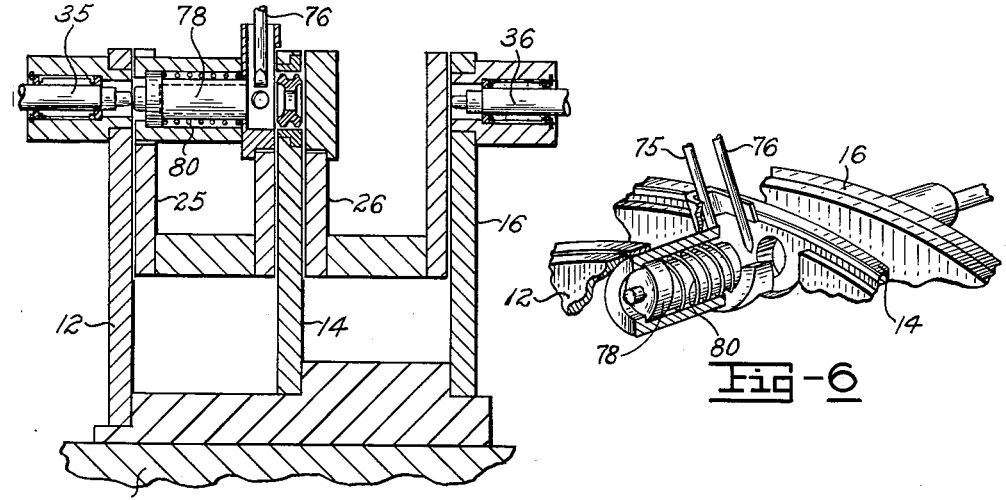
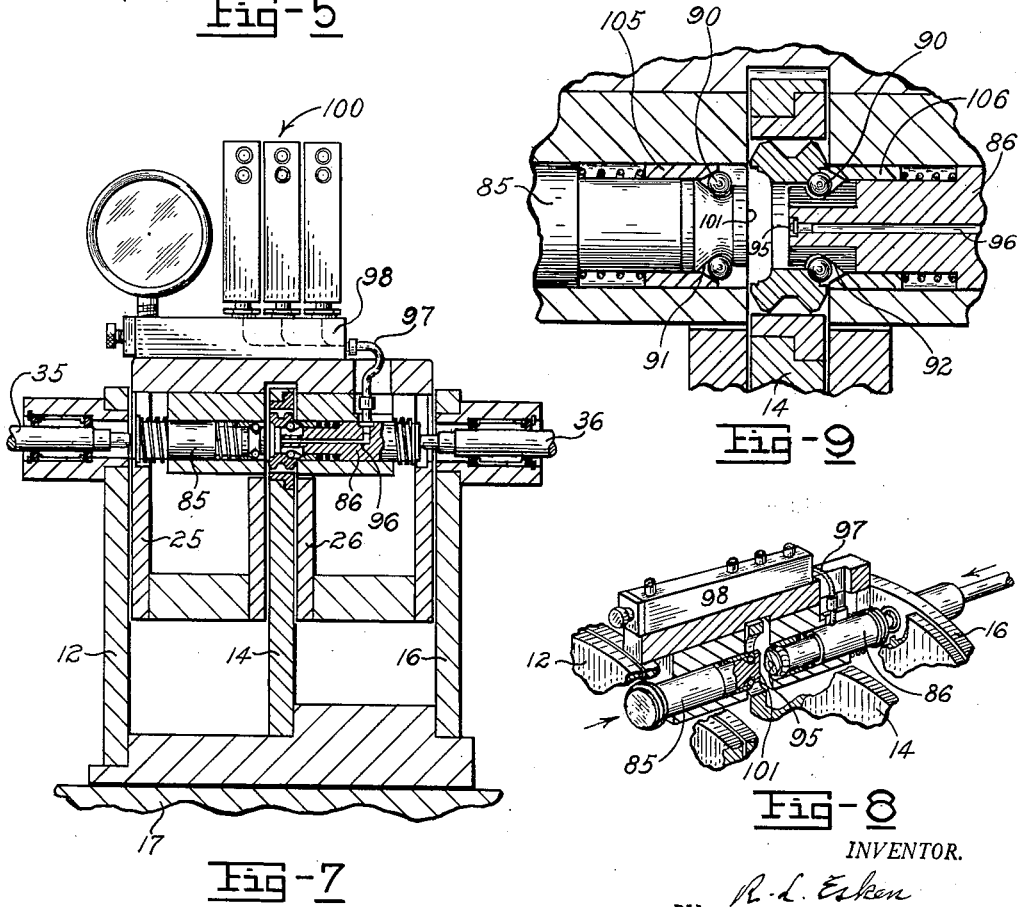

June 6, 1961   R. L. ESKEN   2,986,819
MACHINE FOR GAUGING, SELECTING AND ASSEMBLING PART COMPONENTS
Filed Nov. 19, 1954   8 Sheets-Sheet 5

INVENTOR.
R. L. Esken
BY Edward J. Noij
atty.

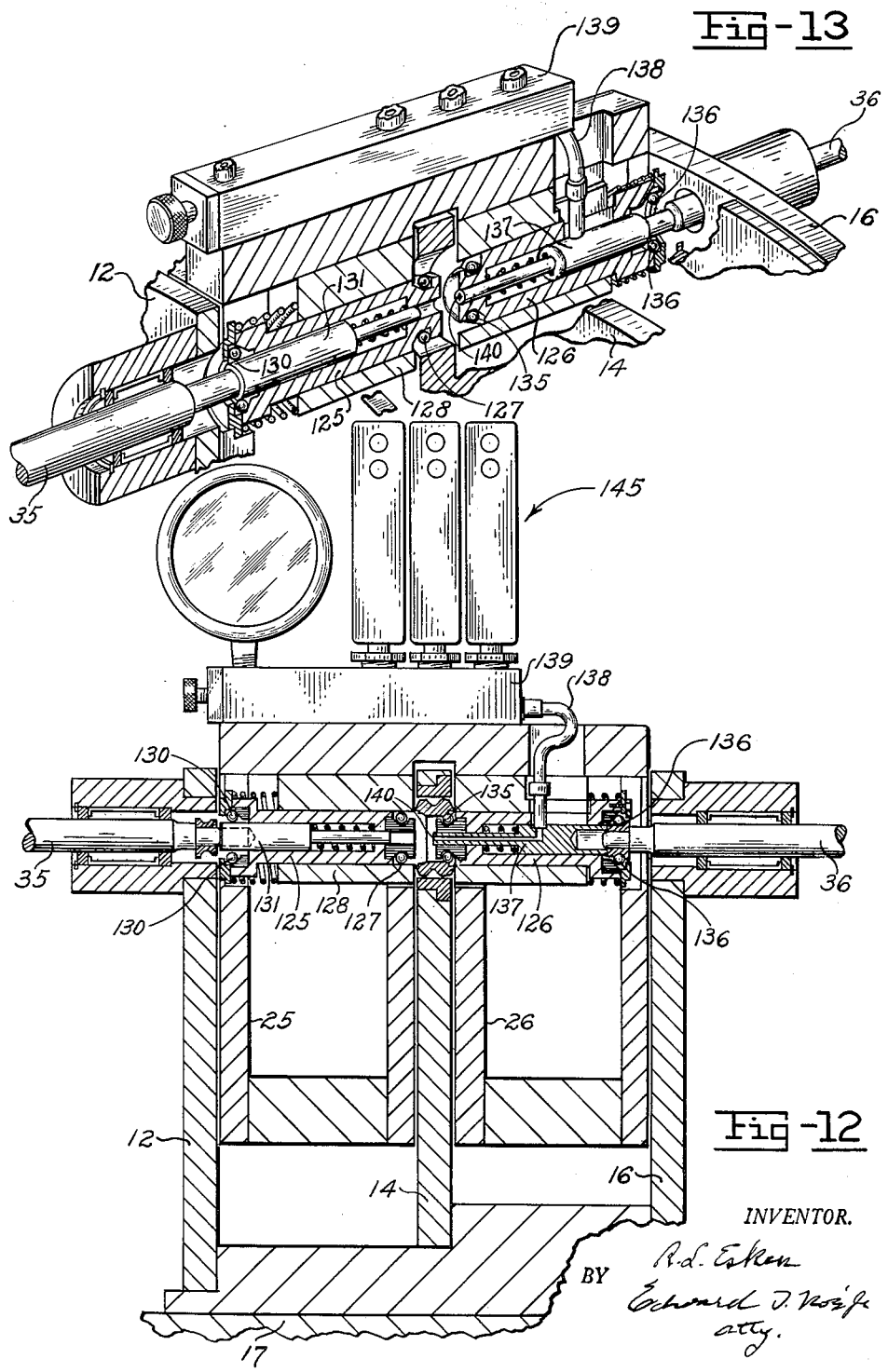

June 6, 1961 R. L. ESKEN 2,986,819
MACHINE FOR GAUGING, SELECTING AND ASSEMBLING PART COMPONENTS
Filed Nov. 19, 1954 8 Sheets-Sheet 7

INVENTOR.
R. L. Esken
BY Edward J. Noip
atty.

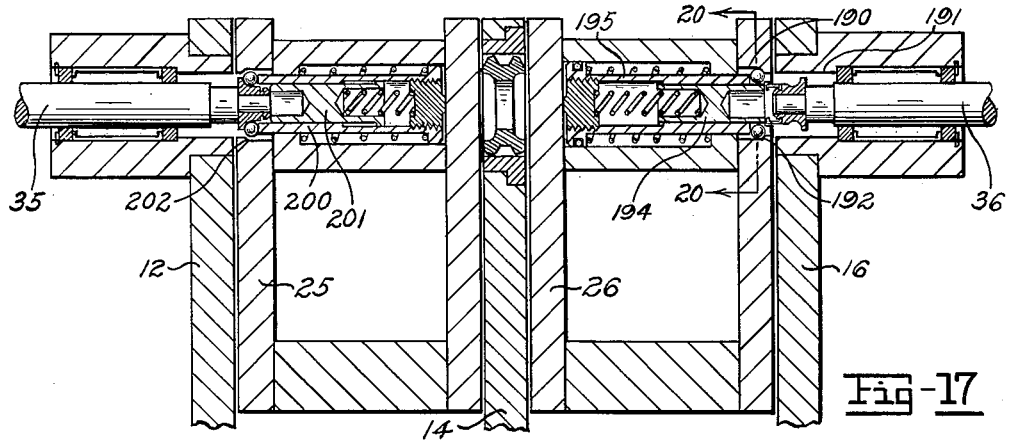
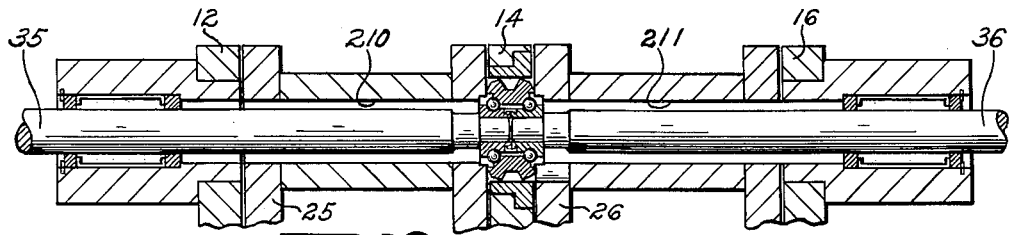
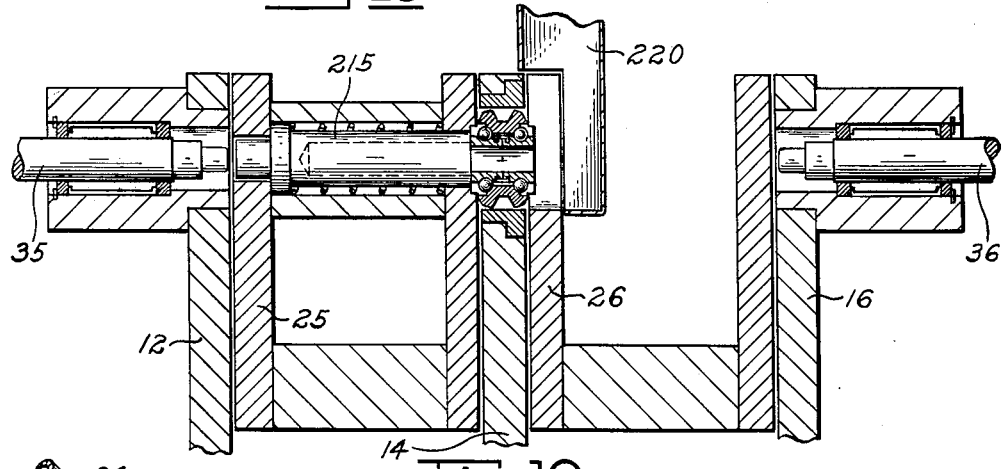
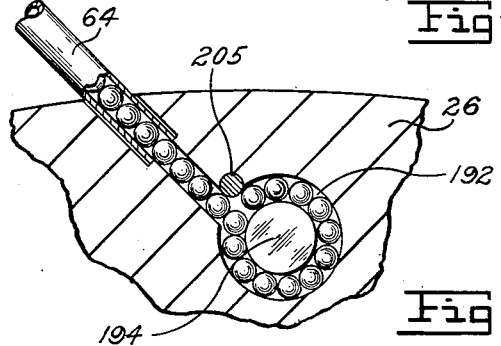

United States Patent Office
2,986,819
Patented June 6, 1961

2,986,819
MACHINE FOR GAUGING, SELECTING AND ASSEMBLING PART COMPONENTS
Robert L. Esken, Dayton, Ohio, assignor, by mesne assignments, to The Sheffield Corporation, a corporation of Delaware
Filed Nov. 19, 1954, Ser. No. 469,939
17 Claims. (Cl. 33—174)

This invention relates to a gauging and assembling apparatus and more particularly to an apparatus for gauging and assembling the components of a ball bearing.

It is an object of this invention to provide an apparatus for gauging, selecting and assembling cooperating components of a part such as a ball bearing or the like, the apparatus comprising a series of operating stations including gauging, loading and assembling stations and carrying means for indexing the part components from station to station whereby part components are gauged, other components are selected and loaded onto the carrying means and the components are assembled into a completed part.

It is a further object to provide an apparatus for operating on the cooperating components of a part wherein the operating stations are fixedly located at equal radii about the axis of rotation of and between component carrying wheels which are driven to index the part components from station to station, the wheels including plungers at the carrying means for cooperation with the operating stations and stationary actuating means mounted in fixed positions at the operating stations and controlled for selective actuation of the plungers at the indexed positions of the wheels.

It is a further object of this invention to provide an apparatus for gauging and selecting cooperating components of a part such as a ball bearing or the like, the apparatus including operating stations and part component carrying means indexed therebetween in sequence, the stations including structure for gauging a first part component and selecting and loading another cooperating component in accordance with the gauging operation, following which these components are gauged together to allow the selection of a third component which cooperates therebetween, thus allowing the gauging and selection of cooperating components of a part to insure proper operation in a unit assembled therefrom.

It is a further object to provide an apparatus for gauging, selecting and assembling the cooperating components of a double row ball bearing having a split inner race from sources of components including a source of outer bearing races having random raceway dimensions within the tolerance range, a plurality of dimensionally classified groups of inner race segments, and a plurality of groups of dimensionally segregated balls, the apparatus including structure for gauging the dimensional characteristics of a random outer race and selecting inner race segments from the appropriate classified group; gauging the dimensional relationship between the raceways of the inner race segments and the outer race and selecting balls from that classified group to be properly assembled therewith; and assembling the bearing components into a complete operating unit with insurance that all operating tolerances will be satisfied.

It is a further object to provide an apparatus particularly adapted for assembling the components of a double row ball bearing having a split inner race and a snap ring cooperating between annular grooves of the inner race for maintaining the bearing in assembled condition, the apparatus comprising structure by which the snap ring is inserted into the groove of one inner race segment, balls are loaded around the raceways of each of the inner race segments and the components are moved axially into assembled relationship, allowing the snap ring to also seat in the annular groove of the other inner race segment to maintain the bearing in assembled condition.

It is a further object to provide a device for distributing a row of balls around an inner raceway of a ball bearing and maintaining the balls in distributed condition wherein the race is moved axially within a supported annular series of balls and is retracted while the balls are retained about the raceway both during and after the retraction from the ball supporting structure.

It is a further object to provide a simple device for automatically assembling a snap bearing in an annular groove in a part, the device comprising structure for holding a snap ring and moving a part axially thereinto while spreading the snap ring holding means and including further structure for axially removing the assembled snap ring and part while maintaining the holding means in spread condition and then conditioning the apparatus for a subsequent assembly operation.

It is a further object to provide a device for gauging the dimensional characteristics of a pair of inner or outer raceways of a double row ball bearing race characterised by intersecting contact angles, in which the device includes gauging contact means carried for movement inward toward one another along the axis of the race and into limited relative positions as determined by their engagement with the raceways, and gauging means cooperating between the gauging contact means responsive to the dimensional characteristics of the raceways.

It is a further object to provide a gauging device as set forth in the object next above wherein feeding means are provided to move a race transversely into position between the gauging contacts after which the gauging contacts move inward toward one another, and in which the cooperating gauging means comprise a fluid leakage orifice positioned by one contact means and an orifice controlling surface positioned by the other, the flow through the orifice being responsive to the dimensional characteristics of the raceways.

It is a further object of this invention to provide a unit for use in gauging ball bearing raceway characteristics wherein gauging contacts are provided which comprise freely rotatable balls held when the unit is inactive in gauging by a retaining means and adapted for extension beyond the retaining means and into engagement with a raceway in gauging.

It is a further object to provide a gauging device for measuring the dimensional relationship between the cooperating pairs of raceways of a double row ball bearing to determine the size balls for assembly therewith, in which raceways of the race components are engaged to relatively locate the components in accordance with dimensional characteristics of the raceways and means cooperate between the race components when so relatively located responsive to the dimensional relationship between the raceways as they would exist in the assembled bearing.

It is a further object to provide a gauging device for measuring the dimensional relationship between the raceways of a double row ball bearing having a split inner race wherein means are interposed between each cooperating pair of raceways, each of the raceways being engaged by freely rotatable ball contacts, and in which the spacing between the inward facing end faces of the inner race segments is gauged when the components are so spaced to determine the mean ball space between cooperating raceways in the assembled bearing.

Other objects and advantages of the invention will be apparent from the following description, the appended claims and the accompanying drawings, in which, FIGURE 1 is a view in perspective, partially broken away, illustrating an apparatus for gauging, selecting and assembling the components of a double row ball bearing and embodying the present invention.

Figure 4:
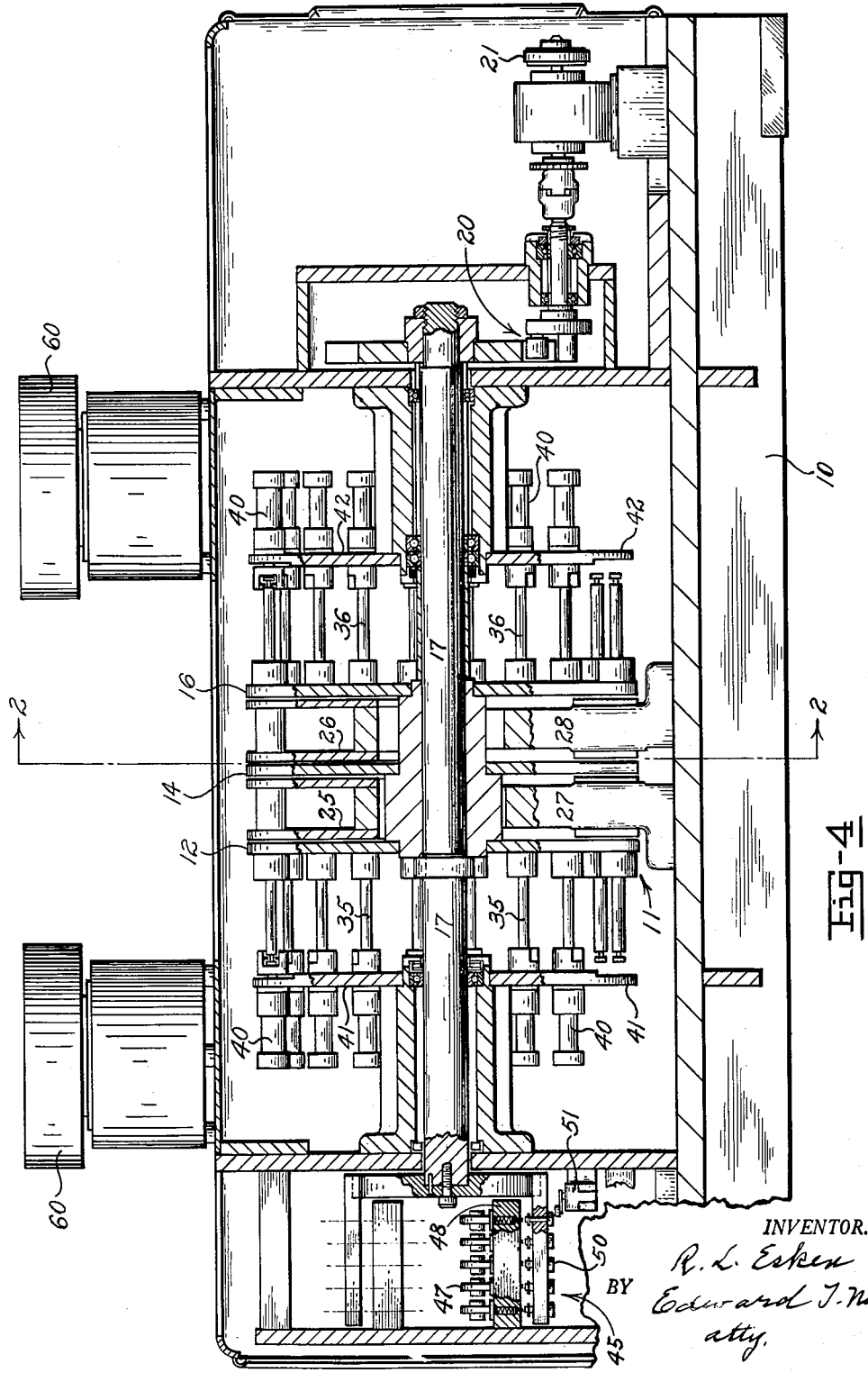
Figure 11:
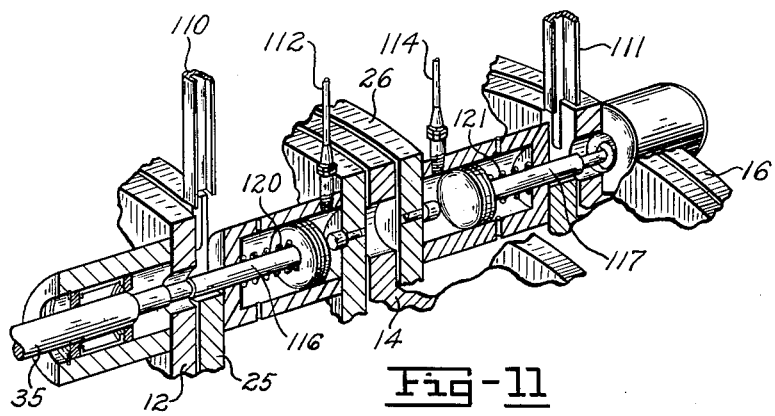
Figure 10:
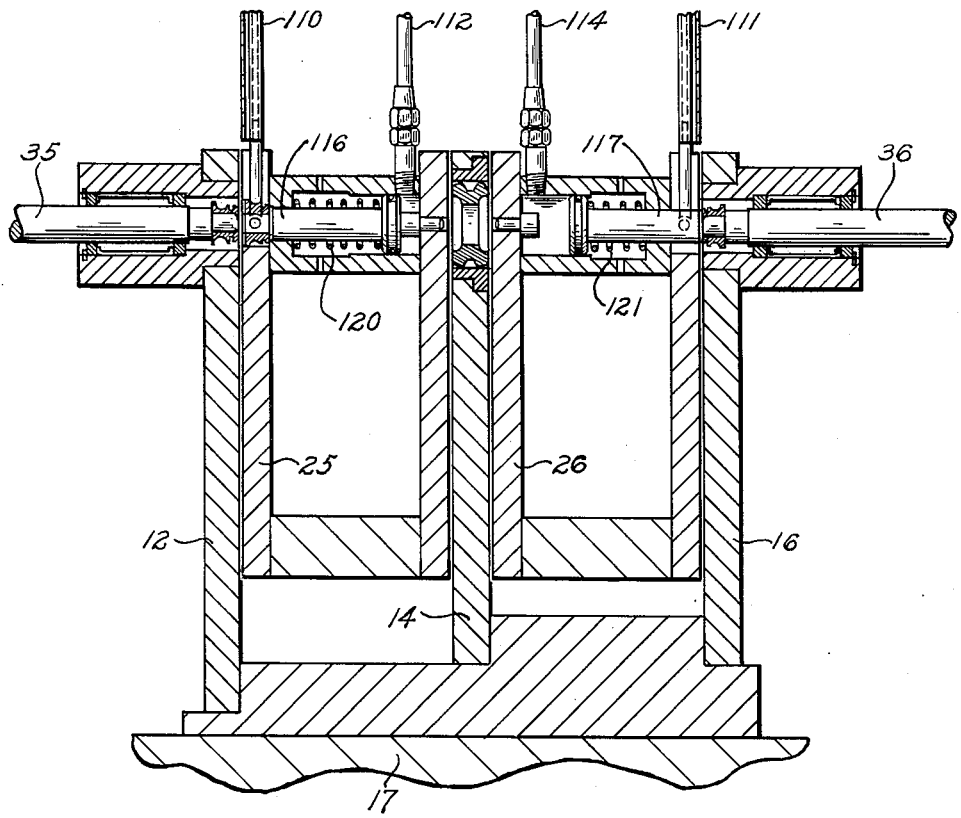
Figure 14:
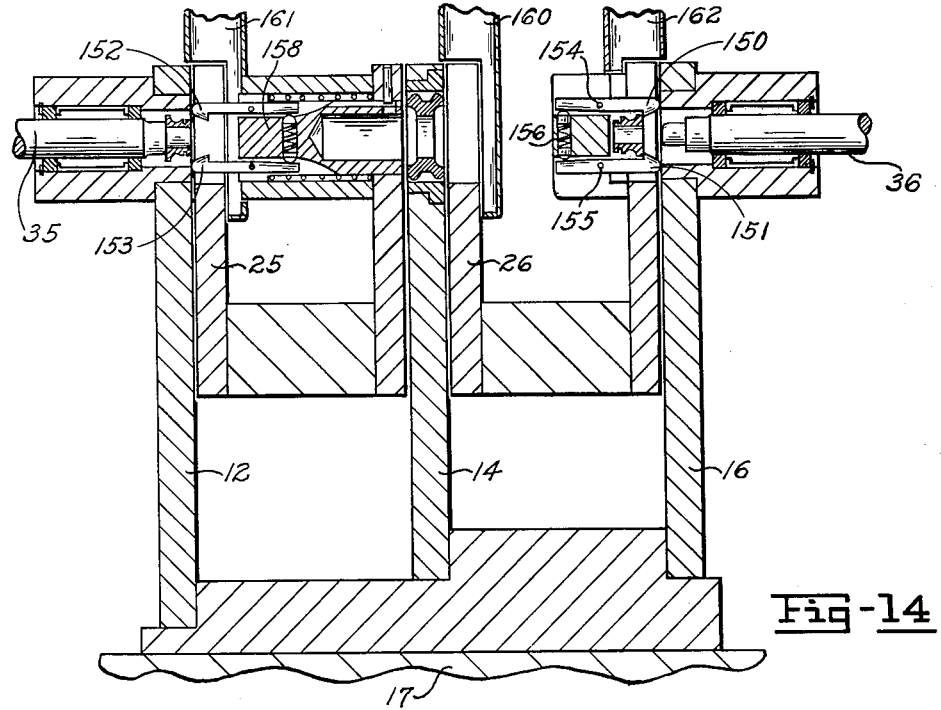
Figure 15:
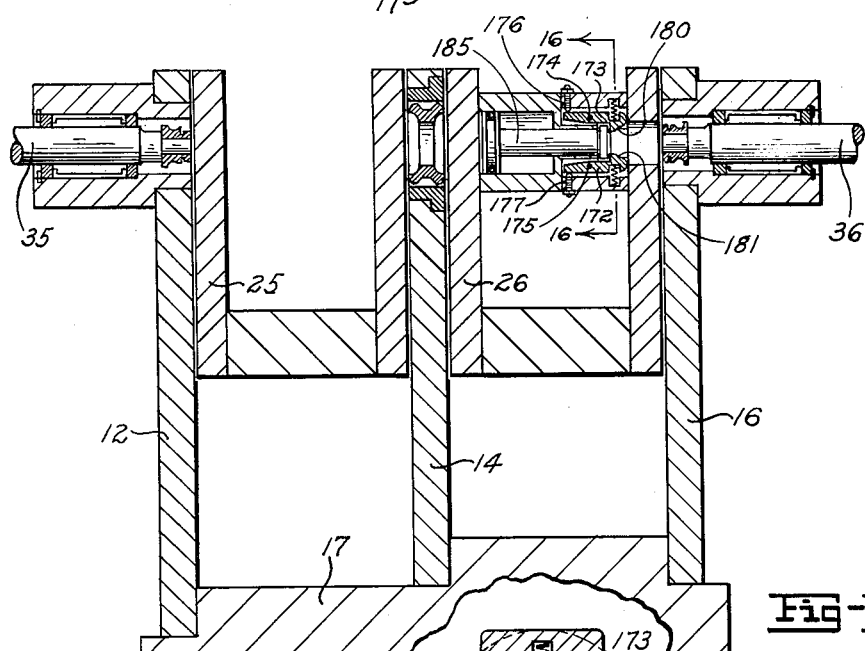
Figure 16:
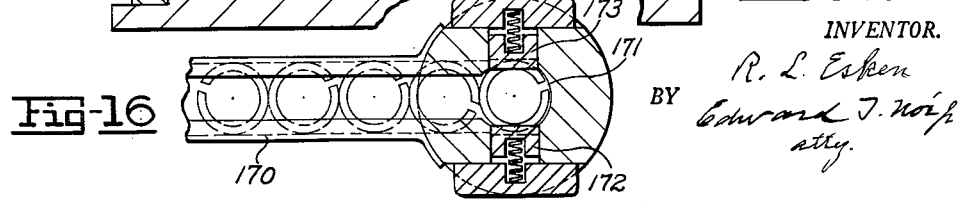

FIGURE 2 is a central transverse sectional view of the apparatus taken on line 2—2 of FIGURE 4, FIGURE 3 is a diagrammatic view illustrating a portion of the air and electrical system involved in the control of the apparatus, FIGURE 4 is a longitudinal central sectional view taken on line 4—4 of FIGURE 2 illustrating primarily the index structure and its drive, the support for the operating stations, the actuating means for the operating stations, and the memory device involved in the operation of the apparatus, FIGURE 5 is a sectional view taken on radial line 5 of FIGURE 2 illustrating station No. 1 for loading an outer bearing race in the index structure, FIGURE 6 is a perspective view of this same station, FIGURE 7 is a view of station No. 2 for gauging the dimensional characteristics of the raceways of the outer race, taken on radial line 7 of FIGURE 2, FIGURE 8 is a perspective view, partially broken away, of station No. 2, FIGURE 9 is an enlargement of a portion of FIGURE 7, FIGURE 10 is a radial sectional line 10 of FIGURE 2 and illustrates one of a series of stations Nos. 3 and 7 which supply and load selected inner race segments onto the carrying plungers of the index structure, FIGURE 11 is a perspective view, in partial section, of one of stations Nos. 3–7, FIGURE 12 is a sectional view taken on radial section line 12 of FIGURE 2 and discloses station No. 8 at which the inner race segments and outer race are matched, FIGURE 13 is a perspective view, in partial section, of station No. 8, FIGURE 14 is a sectional view on radial line 14 of FIGURE 2 and discloses station No. 9 which is the reject station for rejecting the bearing components if a proper match cannot be made, FIGURE 15 is a view taken on radial line 15 of FIGURE 2 and shows station No. 10 for assembling a snap ring onto one inner race segment, FIGURE 16 is a sectional view on line 16—16 of FIGURE 15, FIGURES 17, 18 and 19 are sectional views taken on radial lines 17, 18 andw 19 of FIGURE 2 respectively, FIGURE 17 illustrating one of a series of stations 11 to 14 each of which is provided to select balls from one of a series of ball classification groups in response to the gauging at maching station No. 8; FIGURE 18 discloses the assembly station No. 19; FIGURE 19 illustrates station No. 20 for ejecting the assembled bearing from the apparatus, and FIGURE 20 is a detail section of the ball retaining structure of the ball selection station of FIGURE 17.

The particular apparatus illustrated is provided for gauging, selecting and assembling the components of a bearing. In this apparatus a series of operating stations are spaced apart in fixed positions. Supporting means for the bearing components are indexed from station to station. Stationary actuating means are spaced for cooperation with each of the stations and are operated in response to a memory system controlled by gauging operations at the gauging stations.

The operating stations comprise, in sequence: station No. 1 at which an outer race is loaded into the indexing means; station No. 2 at which the dimensional characteristics of the outer race are gauged; stations Nos. 3 to 7 which are selecting stations responsive to the gauging operation at station No. 2 and each of which is connected for selecting and loading inner races or race segments from one of a number of classified groups onto the carrying means; station No. 8 which is a gauging station for gauging the dimensional relationship between the random taken outer race and the selected inner race or race segments; at station No. 9 if a match cannot be achieved for assembly with any one of several available ball selections, the components are rejected at this station; where a double row bearing with retaining snap ring is involved, station No. 10 is provided with structure for assembling the retaining snap ring on one inner race segment; stations 11–14 are ball selection stations responsive to the gauging operation at station No. 8 for loading balls from the selected classification into the index carrying means; stations Nos. 15 to 18 are blank to provide for support for the operating stations and the component carrying means; at station No. 19 the components of the bearing are assembled; and at station No. 20 the assembled bearing is ejected from the apparatus.

*General arrangement*

In the specific disclosed apparatus structure is provided for gauging, selecting and assembling the components of a double row ball bearing having a split inner race held in assembled position by a snap ring. The apparatus is supported upon an apparatus base 10. The carrying means for the bearing components comprises an index wheel indicated generally at 11 which includes three part-carrying disks 12, 14 and 16 mounted on shaft 17 rotatably carried from the apparatus base 10. Shaft 17 is intermittently indexed through a Geneva drive 20 driven from a suitable power source such as electric motor or the like driving pulley 21.

A series of operating stations for gauging, selecting and assembling the bearing components are supported between the center disk 14 of the index wheel 11 and the outer disks 12 and 16. These operating stations are fixedly supported in an annular series about the axis of shaft 17 by supports as indicated at 25 and 26 carried by mounts 27 and 28, respectively, from the base 10. The index wheel 11 contains 20 carrying positions. Each position includes aligned carrying means for the bearing components and is indexed through the sequence of stations as earlier described.

At each position on outer disks 12 and 16 a slidable plunger or spindle is carried as indicated, for example, at 35 and 36 in FIGURE 4. These spindles serve to carry the inner race segments after they are loaded into the outer disks 12 and 16 and to actuate the mechanism of the operation stations as is necessary. Operating air cylinders 40 are carried by stationary disks 41 and 42 at the outer sides of each of the rotatable disks 12 and 16. These air cylinders 40 are actuated at the various stations to move the operating plungers for gauging, assembling, rejecting and similar operations. It will be noted that spindles 35 and 36 have enlarged outer ends which are carried into operative relationship with the stationary actuating cylinders 40 at the indexed positions of wheel 11. The operation of these air cylinders, and other actuating devices included within the operating stations themselves and to be later described, are controlled by a memory system indicated generally at 45.

This memory device 45 is set by the gauging operations at stations Nos. 2 and 8. The device then determines at which of the inner race segment selection stations and ball selection station components should be loaded into index wheel 11 for assembly. For example, there are five groups of inner race segments provided in classifications determined by their raceway dimension. Five select solenoids 47, one for each inner race segment classification group, are mounted on a bar 48 extending from the side wall of the apparatus. In accordance with the gauging operation performed at station No. 2 on the raceways of the outer race, one of the select solenoids 47 is energized to actuate a spring loaded solenoid plunger and extend one of the memory pins 50. Memory pins 50 are provided at each position of the index wheel 11 and rotate therewith. For each of the inner race selection stations a select switch 51 is mounted in the path of one of the memory pins 50. When the extended memory pin 50 engages the selection switch 51 at the selection station inner race segments from that station are loaded onto the index carrier 11. A similar memory system is provided responsive to the gauging operation at station No. 8 and controlling the reject station No. 9 and ball selection stations 11 to 14. This memory system is of a conventional type and for that reason details of its specific structure have been omitted, such systems being well known to those skilled in the art. A portion of such a system which could be utilized is later described in connection with stations Nos. 2 and 3 to 7.

When the select switch 51 at a selection station is energized, the appropriate one of the air cylinders 40, or actuating plungers within the station themselves, are actuated for a selection operation.

Five groups of previously gauged and classified inner race segments are contained in vibration type hoppers 60, each of which has chutes leading to both sides of the center disk 14 at one of the inner race segment selection stations. Four boxes 61, one of which is indicated at 61 in FIGURES 1 and 2, contain bearing balls in four dimensional classification ranges. Balls from each of the ball retaining boxes 61 are led through tubes to one of the ball selection stations to feed balls thereto at each side of center disk 14 of the feeding structure. For example, in FIGURE 2 the balls will flow through a tube 62 and into a conduit 64 which is split to provide balls at each side of the selection station. The tube 62 is vertically vibrated to insure feeding of the balls through a bellcrank arrangement 65 actuated by cams 66 spaced about the periphery of the index wheel 11. The retaining snap rings are carried in a vibrating type hopper not shown and are fed to station No. 10. Alternatively these snap rings can be fed through a hand loaded feed tube. The outer races in a random selection within the manufacturing tolerance are placed in a vibrating hopper 70 for feeding to the outer race loading station No. 1. Balls from any one of the classified groups can be used with a random outer race and segments from any of the inner race classification groups—thus giving an effective multiplication of classifications. Preferably each of the component containers is keyed into the apparatus support in a different manner so that the classifications cannot be improperly placed for feeding. The feeding hoppers are of the conventional type employing vibration to separate and feed the components.

*Station No. 1*

Outer races from the hopper 70 are stacked in chute guide rails 75, 76 (see FIGURE 2) and fed to the loading station as seen in FIGURES 5 and 6. The left-hand air cylinder 40 is actuated on each index movement. This forces the left-hand spindle 35 inward against plunger 78 which in turn forces the outer race into the center disk 14. Spring 80 returns plunger 78 to its normal position and another outer race slides down the rails 75 and 76 into loading position within the station. Thus an outer race is loaded into each position of the center disk 40 of the index wheel 11 as it arrives at the loading station.

*Station No. 2*

The details of this station for gauging the raceway characteristics of the outer race are shown in FIGURES 7 to 9.

After an outer race is indexed into position both the left-hand and right-hand air cylinders 40 are actuated to force spindles 35 and 36 inward against plungers 85 and 86 to carry these plungers into gauging position. Each of the gauging plungers 85 and 86 in the illustrated apparatus will carry a full row of balls of nominal size as necessary for each application in an annular groove at the adjacent inner ends thereof. The balls 90, only two of which appear in each of the figures, are carried in an annular groove in the plunger 85 and referenced against a 45 degree angle carbide contact face which is perpendicular to the necessary nominal contact angle in this particular application. This contact face is indicated at 91 for plunger 85 and at 92 for plunger 86. Each of the plungers 85 and 86 will be moved to inward limited positions as determined by the engagement of the contact balls with the adjacent raceway of the outer race. The plunger 86 is shown in its inward position as it would be in gauging and the plunger 85 illustrated as retracted. It will be understood that in actual operation both of the plungers occupy common positions.

The ball space in the assembled bearing will vary with the diameter and radius of each of the raceways of the outer race and the relative axial spacing between the raceways. It will be appreciated that the inward extension of each of the plungers 85 and 86 will be determined by the dimensional characteristics of each of the raceways and that the plungers will also be relatively spaced in accordance with the axial spacing therebetween. Thus the relative inward positions of the gauging plungers will be determined by those characteristics of an outer race which determine the operating conditions of an assembled bearing. The plunger 86 has an open orifice or jet 95 at its inner end which communicates through a passage 96 and a conduit 97 to a manifold block 98 which mounts a series of gauging heads 100. The inner end face 101 of the plunger 85 opposes this orifice 95 and therefore the air escaping from orifice 95 is determined by the relative position of the plungers and the raceway characteristics. The gauging heads 100 are of a known construction being shown for example in Patent No. 2,448,653, issued September 7, 1948. These gauging heads 100 convert the gauging pressures into actuation of electric switches controlling the select solenoids 47. Depending upon the dimension of the raceway of the outer race one or the other of select solenoids 47 is actuated to extend a corresponding memory pin 50 and, as the index movement of the wheel 11 continues, at the appropriate inner race segment selection station the extended memory pin 50 strikes a select switch 51 for that station to load inner race segments from the appropriate classification group into the outer disks 12 and 16 of the index wheel 11.

The spring loaded collars or sleeves 105 and 106 surrounding a portion of the plungers 85 and 86 respectively, are provided for the purpose of retaining the balls when an outer race is not in the center disk. The collar 105 is in retaining position and an inclined cam surface at its outer end is in engagement with the balls 90 retaining them within the annular groove of the plunger 85. The sleeve 106 however has engaged the adjacent face of the outer race allowing the extension of the plunger 86 therebeyond to carry the gauging balls into contact with the raceways. It will be noted that each of the plungers 85 and 86 can be easily removed as a unit to permit cleaning and replacing of the gauging balls because of this unique ball retaining structure.

*Stations Nos. 3–7*

There are five selection stations for the inner race segments controlled by the gauging operation at station No. 2 as above described. The gauged outer race is carried in the center disk 14 and is indexed through these selection stations where the memory device 45 will determine at which station the inner race segments should be inserted into the outer disks 12 and 16 at that particular position. Figures 10 and 11 illustrate one of these stations. Inner race segments from one of the supply hoppers 60 are stacked in guide chutes 110 and 111 at each side of the center disk 14.

At the appropriate selection station air under pressure is supplied through conduits 112 and 114 to extend plungers 116 and 117 outward to transfer the inner race segments onto spindles 35 and 36. In FIGURE 10 the plunger 116 is shown in a retracted position with an inner race segment in loading position adjacent its left-hand end and a segment loaded onto the inner end of spindle 35. The right-hand plunger 117 is extended as it would be in carrying an inner race segment onto the inner end of spindle 36. Of course both plungers 116 and 117 operate simultaneously to load a selected pair of inner race segments onto spindles 35 and 36 carried by the outer disks 12 and 16 and into axial alignment with the previously gauged outer race for which they have been selected. Springs 120 and 121 serve to move the plungers 116 and 117 back into normal position.

FIGURE 3 illustrates diagrammatically a portion of a memory system which could be utilized between gauging station No. 2 and selection stations Nos. 3–7. It will be noted that one of the gauging heads 100 has been shown with a Bourdon tube responsive to the gauging pressure for actuating either one of switches 102 and 104. The other gauging heads 100 are similarly constructed and the switches are set to respond to different gauging pressures as determined by the characteristics of the outer race. For example, if Bourdon tube 99 deflects to the right and opens switch 104, relay 108 will close a switch in a circuit to select solenoid 47. This will extend memory pin 50 and, at the proper one of stations 3–7, the pin will strike select switch 51 to actuate solenoid air valve 109 and feed air under pressure to extend plungers 116 and 117 to load segments into the outer carrying disks.

Station No. 8

In an assembled ball bearing the inward end faces of the inner race segments abut one another and the mean ball space which must be properly filled for a properly assembled bearing is the mean of the spaces between the cooperating pairs of raceways. This gauging station is provided to match the bearing races and to determine the classification from which balls must be selected to be assembled therewith. In this apparatus the inner race segments are carried coaxially at each side of the outer race and in relative positions similar to that which they occupy in the assembled bearing. Spacing means are interposed between each cooperating pair of raceways to space the race components apart in accordance with the dimensional characteristics of each of the engaged raceways and the axial spacing between the outer raceways. Each of the spacing means includes nominal size ball contacts at each end thereof cammed into engagement with a raceway of an inner race segment and the cooperating raceway of the outer race at the nominal contact angle by cam surfaces perpendicular to the nominal contact angle. The nominal ball size and contact angle are as necessary for each particular application. With the cooperating bearing components so spaced apart gauging means are provided for measuring the displacement of the adjacent inwardly disposed end faces of the inner race segments. The gauging means will be responsive to the mean ball space between the raceways when the components are assembled with the end faces of the inner race segments abutting.

Spacing plungers are provided at 125 and 126 in this gauging station. Each of the plungers is similarly conformed. Noting in particular plunger 125 it will be seen that contacting balls 127 are distributed in an annular groove at its right-hand end and are retained in this groove by cooperation with the cylindrical housing 128 of the gauging station when the plungers are is retracted position. The right-hand plunger 126 is shown in gauging position. The left-hand plunger 125 is shown in retracted or normal position. Balls 130 are annularly distributed in an inwardly facing annular groove in the structure of plunger 125 and when the plunger is retracted as shown are maintained in position by a gauging plunger 131. Plunger 137 similarly carries balls 135 at its left-hand end and balls 136 at its right-hand end as viewed in FIGURE 12. A gauging plunger 137 is slidably carried within the spacing plunger 126 and includes an air-leakage orifice 140 at its inner end communicating through a passage to a conduit 138 leading to a manifold block 139 and a series of gauging heads 145.

After the outer race and inner race segments have been indexed to the selected one of these stations, air cylinders 40 at this station are actuated. This forces spindles 35 and 36 inward. Noting in particular spacing plunger 126 and gauging plunger 137, it will be seen that the inner face of the right-hand inner race segment engages the gauging plunger and carries it inward from between gauging balls 136 as the inner race segment moves into contact with the balls. Both plungers 126 and 137 then move together until the inward balls 135 engage the right hand raceway of the outer race. Simultaneously similar conditions occur at the left-hand portion of the station to space the left-hand race segment a predetermined distance from the left-hand raceway of the outer race. Plunger 137 references from the inner face of the right-hand inner segment and positions the air jet 140 while plunger 131 references against the corresponding face of the left-hand race segment and its inner end opposes this air jet to control the flow of air from the orifice 140 and the resultant gauging pressure in accordance with the size balls required for assembly. The gauging heads 145 operate in the same manner as do those for gauging station No. 2 to control memory devices which cooperate with a subsequent reject station and four subsequent ball selection stations to actuate the proper cylinders 40 and either reject the components or select the proper size balls and feed them into the apparatus.

Station No. 9

This station is provided to reject the bearing components from the apparatus if a proper match for the available ball sizes cannot be made at the gauging station No. 8.

The left-hand air cylinder 40 at this station has a substantially longer stroke than the right-hand air cylinder. After the outer race and inner race segments are indexed into position the air cylinders are actuated, providing a proper match could not be made at the gauging station. This forces spindles 35 and 36 inward.

In FIGURE 14 the left-hand spindle 35 is shown prior to its inward movement and spindle 36 is shown after completion of its inward movement and retraction. The inward movement carries the inner race segments in between stripper fingers 150 and 151 at the right-hand side of the station and 152 and 153 at the left-hand side thereof. The stripper fingers are pivoted as indicated at 154 and 155 for fingers 150 and 151 and their stripping ends are biased together by an interposed spring assembly 156. The left-hand stripper fingers 152 and 153 are similarly actuated. The left-hand spindle 35 continues inward because of the longer stroke of its actuating cylinder 40 and engages plunger 158 to move it inward against a spring bias until the outer race is ejected from the center disk 14 into a chute 160. Upon retraction of the spindles 35 and 36, the stripper fingers strip the inner race segments from the spindles and into chutes 161 and 162.

Station No. 10

The mechanism at this station is provided to assemble the retaining snap ring in the groove of the inner race segment carried in the right-hand disk 16.

Snap rings are fed down a chute 170 and into a chamber 171 formed in the station housing. When so situated the snap ring is positioned between two retaining fingers as indicated at 172 and 173. These retaining fingers are spring biased about pivot pins 174 and 175 to limited positions as determined by the engagement of their inner ends with adjustable stops 176 and 177. At their outer ends the retaining fingers 172 and 173 have inclined facing surfaces 180 and 181 and inner surfaces which grip and retain the snap ring.

After the outer race and inner race segments have been indexed into position the right-hand air cylinder 40 at this station is actuated to force spindle 36 inward. As the inner race segment moves inward it engages the inclined faces 180 and 181 of the retaining fingers 172 and 173 to force them open and the inner race segment snaps into the retaining ring. At this point air operated plunger 185 is actuated to force the assembled inner race segment and retaining ring and spindle 36 outward into normal position. The air operated plunger 185 is returned to its retracted or normal position under air pressure. The retaining fingers 172 and 173 prevent the retaining snap rings as they are fed from falling into the index disk 16. After the spindle 36 is returned to position and the plunger 185 has retracted, another snap ring moves into the chamber 171 and in between the retaining fingers 172 and 173.

Stations Nos. 11 to 14

The outer race and selected inner race segments are indexed through this series of stations to the proper station at which balls will be inserted around both of the inner race segments. In the righthand portion of the station as viewed in FIGURE 17 the components are in their normal position prior to the insertion operation. It will be noted that at each side of center disk 14 a passage is formed of cylindrical cross-section throughout its length which has two aligned sections of different diameters. For the passage at the right-hand side of the station the larger section is indicated at 190 and the smaller at 191 with a cam surface therebetween is indicated at 192. The spindle 36 is carried for movement along the axis of this passage and supports the inner race segment and snap ring. An inner plunger 194 having a diameter substantially equal to that of the inner end face of the inner race segment is carried within a piston actuated sleeve 195. An annular row of balls is distributed around the inner plunger 194 and is retained in an annular pocket formed by the outer surface of this plunger, the inclined cam surface 192, and the right-hand end of the sleeve 195. It will be noted that the larger passage section 190 has a diameter substantially equal to that of the sum of the diameters of two balls plus the diameter of the inner plunger 194 while the sleeve 195 has a diameter which is smaller than that of the smaller passage section 191 only by an operating clearance for sliding thereinto. The components of the station at the left-hand side of FIGURE 17 correspond to those at the right-hand and include a sleeve 200 and inner plunger 201. A row of balls is held distributed in a pocket 202 in a manner similar to that at the right-hand side of the station. FIGURE 20 illustrates in section the supplying tube and the annular pocket which receives and positions the row of balls. A projecting pin 205 in the pocket allows a full row of balls to distribute therearound.

To distribute rows of balls around each of the inner race segments the air cylinders 40 at each end of this station are actuated to move the spindles 35 and 36 inward toward one another. Noting in particular the assembly at the right-hand side of this station as illustrated, the inner plunger 194 will be depressed until the segment stops against the row of distributed balls. At this point the balls will position themselves around and within the raceway groove of this race segment. Air operated sleeve 195 is then actuated outward to force the row of balls and the inner race segment and the spindle 36 back to normal position. The inclined cam surface 192 forces the balls in the race around the raceway. In normal retracted position the balls are maintained in the raceway of the segment by the cavity in the smaller cylindrical passage section 192 around the spindle 36. A similar operation takes place upon the inward actuation of spindle 35 and outward actuation of the sleeve 200. Thus the inner race segments are returned into the outer carrying disks 12 and 16 with a distributed row of balls around each of them.

Station No. 19

This is the station where the random taken outer race, the selected inner race segments, the distributed balls, and the partially assembled snap ring are moved axially in together into assembled relationship. The actuating air cylinders 40 for this station have an exceptionally long inward stroke.

After the balls, inner race segments and outer race are indexed into position, the air cylinders 40 are actuated to force the spindles 35 and 36 inward to carry the inner race segments and balls into the outer race until the snap ring on the right-hand inner race segment engages the left-hand race segment and the bearing is assembled (as illustrated). It will be noted that the diameters of the passages 210 and 211 within this station are small enough to retain the balls within the raceway grooves of the inner race segments as they move inward. After the assembly operation the spindles 35 and 36 are retracted leaving the assembled bearing in the center carrying disk 14.

Station No. 20

At this station the assembled bearing is ejected from the apparatus. After the assembled bearing is indexed into position, a left-hand air cylinder 40 is actuated to force the spindle 36 against a spring urged plunger 215 to engage the assembled bearing and eject it into a chute 220, removing the assembled bearing from the apparatus.

Thus it is seen that an apparatus has been provided for gauging, selecting, and assembling the components of a bearing. The apparatus of this invention is reliable for rapid, repeated operations through a long service life. Provision has been made for handling, gauging, and assembling complexly and precisely conformed parts and part components through structures which are simple in arrangement and operation.

While the form of apparatus herein described constitutes a preferred embodiment of the invention, it is to be understood that the invention is not limited to the precise form of apparatus disclosed, and that changes may be made therein without departing from the scope of the invention which is defined in the appended claims.

What is claimed is:

1. A gauging device for measuring the spacing between two outwardly facing annular surfaces at each end of a passage through a part, said device comprising a base, means mounted on said base for carrying a part in gauging position, first and second gauging members, each including a plurality of contact means relatively spaced in annular relationship for engagement with one of said part surfaces, means supporting said gauging members on said base for relative movement toward one another along the axis of the part passage and to limited relative positions as determined by the engagement of the respective contact means with the corresponding part surfaces, gauging means in the device axially disposed within the annularly arranged contact means and responsive to the relative positions of the gauging members and the surface spacing, and actuating means connected to relatively retract said gauging members and withdraw said gauging means from the part passage upon completion of a gauging operation.

2. A gauging device for measuring the dimensional characteristics of the raceways of a double row ball bearing race characterized by intersecting contact angles, comprising a base, means mounted on said base carrying a race in gauging position, a pair of opposed gauging means each having annularly spaced contact means for positioning engagement with the respective raceway, means supported on said base and carrying said gauging means for relative movement along the axis of the race to carry said contact means into respective engagement with the raceways, the gauging means having projecting portions providing opposed end faces axially disposed within the annularly arranged contact means spaced apart at the limit of their inward movement within the bearing race in accordance with the dimensional characteristics of the raceways, one of said end faces having a fluid leakage orifice opening therethrough and the end face of the other gauging means including an opposed orifice controlling surface, means connected to said fluid leakage orifice adapted for connection to a source of fluid under pressure and a gauge, and actuating means operatively connected to relatively retract said gauging means and withdraw said projecting portions following gauging.

3. A gauging unit for measuring the dimensional relationship between the raceways of a double row bearing outer race characterized by intetrsecting contact angles, said unit comprising a base, a pair of opposed plungers, means carrying said plungers from said base in coaxial relationship and for relative movement toward and from one another, means mounted on said base for supporting a race to be guaged between said plungers and in substantially coaxial relationship therewith, freely rotatable ball contacts of nominal size carried at the adjacent ends of said plungers for engagement with the respective bearing raceways at the nominal contact angle to limit the inward plunger movements in accordance with the dimensional characteristics of each raceway and the axial spacing therebetween, means operatively connected to said plungers for relative movement thereof to the limiting inward positions as determined by the engagement of the ball contacts with the respective bearing raceways, and gauging means carried by said plungers cooperating through the race and responsive to the dimensional characteristics of the raceways.

4. A gauging unit for measuring the dimensional relationship between the raceways of a double row bearing outer race, said unit comprising a base, a pair of opposed cylindrical plungers, means carrying said plungers from said base in coaxial relationship and for movement toward and from one another, a disc, means supporting said disc from said base for rotation about an axis parallel to the axes of said plungers, means on said disc for carrying a bearing race with its axis parallel the axis of disc rotation and at the same radial displacement therefrom as said plungers, actuation means operatively connected to said disc for rotation thereof to carry a bearing race to and from a gauging position in axial alignment with said plungers, freely rotatable ball contacts carried at the adjacent ends of said plungers for engagement with the respective bearing raceways to limit the inward plunger movements, means operatively connected to said plungers for inward movement thereof to the limiting inward positions as determined by the engagement of the ball contacts with the respective bearing raceways, and gauging means carried by said plungers cooperating through the race and responsive to the dimensional relationship between the part surfaces.

5. A gauging device for measuring the spacing between two outwardly facing annular surfaces at each end of a passage through a part, said device comprising: a base, first and second elongated gauging members, each gauging member including a plurality of annularly spaced contact means for engagement with one of said part surfaces, means carrying said gauging members from said base in axially aligned relationship and for movement toward and from one another, means on said base for feeding a part transverse the axis of the gauging members and to and from a stationary gauging position in axial alignment with said gauging members and therebetween, actuating means operatively connected to said gauging members for moving them toward one another and to limited inward positions as determined by the engagement of the respective contact means with the corresponding part surfaces, and gauging means in the device axially within said contact means cooperating through the part passage responsive to the relative positions of the gauging members and the spacing between the part surfaces, said actuating means including means to relatively retract said gauging members and remove said gauging means from within the part passage to allow further feeding movement of the part from gauging position.

6. A gauging assembly for use in gauging the cooperating dimensions of a double row ball bearing race having relatively fixed raceways and characterized by intersecting contact angles, comprising a base, a pair of gauging means relatively movable toward and from one another along the axis of a race to be gauged, a plurality of raceway engaging balls, each of said gauging means carrying a plurality of said balls for positioning engagement with one of the raceways and including ball retaining means, each retaining means having an inclined cam surface at the side of the ball remote from the raceway for camming the ball into engagement with the raceway, and retractable means engaging the outer surface of each ball to retain the balls and operative to engage the adjacent end face of the bearing race and retract to allow extension of the balls into engagement with the bearing raceway.

7. In a device for gauging the dimensional characteristics of bearing raceways characterized by contact angles inclined relative to the race axis, in combination, a gauging means, a plurality of raceway engaging balls, said gauging means carrying a plurality of said balls for positioning engagement with the raceway and including retaining means for the balls, said retaining means having an inclined cam surface at the side of each ball remote from the raceway for camming the ball into contact with the raceway and including a retractable means providing an annular surface extensible into the plane of the balls to retain them and retractable to allow engagement of the balls with the raceway.

8. A gauging assembly for use in gauging ball bearing raceway characteristics comprising an elongated member having an annular groove in its surface adjacent one end thereof, a series of raceway engaging balls carried for free rotation and distributed around the annular groove, a sleeve carried for axial sliding along said elongated member and having an annular inclined surface at one end thereof, resilient means cooperating between said sleeve and said member biasing said sleeve in one direction to engage the annular inclined surface with said balls to retain them in the annular groove and allowing extension of the elongated member outward relative to the sleeve to allow engagement of the balls with a bearing raceway in gauging.

9. A gauging assembly for use in gauging ball bearing raceway characteristics, said unit comprising: a base, means on said base carrying a bearing race in gauging position; a gauging assembly comprising, an elongated gauging member having an annular groove in its surface adjacent one end thereof, a series of raceway engaging balls carried for free rotation and distributed around the annular groove, a sleeve carried for axial sliding along said elongated gauging member and having an annular inclined surface at one end thereof facing inwardly, resilient means cooperating between said sleeve and said member biasing said sleeve in one direction to engage the annular inclined surface with said balls to retain them in the annular groove; a supporting member carried from said base having a passage therethrough coaxial with a bearing race in gauging position, said gauging assembly being carried in said member for movement toward and from the bearing race, actuating means operatively connected to said gauging member to move it toward the bearing race whereby the axial movement of the ball retaining sleeve is limited by engagement with the end face of the bearing race and the gauging member moves outward relative to the sleeve carrying the balls into engagement with the bearing raceway; and gauging means in said unit responsive to the limited inward position of the gauging member and the dimensional characteristics of the bearing raceway.

10. A gauging device for measuring the dimensional characteristics of the cooperating pairs of raceways of a double row ball bearing characterized by intersecting contact angles, said device comprising, means supporting the bearing race components for gauging, gauging means freely rotatable ball contacts of nominal size for engaging each pair of inner and each pair of outer raceways at the nominal contact angle, said gauging means including means for relatively locating the race components in accordance with dimensional characteristics of the engaged raceways and means responsive to the dimensional relationships between the raceways for determining the size balls for cooperation with the gauged raceways.

11. A gauging device for measuring the dimensional characteristics of the cooperating pairs of raceways of a double row ball bearing characterized by intersecting contact angles, said device comprising, means supporting the bearing race components in axially spaced coaxial relationship, gauging means for engaging each pair of inner and each pair of outer raceways at the nominal contact angle, said gauging means including means for relatively locating the components in accordance with dimensional characteristics of the raceways and means responsive to the dimensional relationships between the engaged raceways for determining the size balls for cooperation with the gauged raceways.

12. A gauging device for measuring the mean displacement between the raceways of a double row ball bearing having a split inner race, said device comprising: a base, means mounted on the base carrying the bearing race components in coaxial gauging position, spacing means interposed between each pair of cooperating raceways for locating the iner race segments relative to the outer race at each side thereof in accordance with the dimensional characteristics of the raceways and the axial spacing between the outer raceways, and means in said device engaging the end faces of the inner race segments including means responsive to the displacement therebetween when the segments are so spaced.

13. A gauging device for measuring the mean ball space between the raceways of a double row ball bearing having a split inner race, said device comprising: a base, means mounted on said base carrying the bearing components in gauging position, spacing means in said device interposed between each pair of cooperating raceways for spacing the inner race segments to each side of the outer race a given distance which is greater than that in an assembled bearing and which is determined by the dimensional characteristics of the engaged raceways, each spacing means including freely rotatable ball contacts of nominal size at each end thereof for respective engagement with the raceways of an inner race segment and the cooperating raceway of the outer race at the nominal contact angle, and gauging means in said device engaging the adjacent end faces of the inner race segments responsive to the displacement between the segments when so spaced.

14. A gauging device for measuring the dimensional relationship between the raceways of a double row ball bearing having a split inner race, the device comprising: a base, means supporting the bearing race components from said base in spaced, coaxial relationship, one inner race segment on each side of the outer race; a pair of opposed gauging assemblies, each assembly comprising a cylindrical spacing sleeve carrying ball contacts at each end thereof for respective engagement with an outer race raceway and the cooperating raceway of an inner race segment, means supporting said sleeve in said device in coaxial relationship with the axis of the bearing race components, means for engaging the outer face of an inner segment to urge it toward the outer race to a limited inward position, a plunger carried concentrically in said sleeve, resilient means cooperating between said sleeve and said plunger for maintaining one end of said plunger in engagement with the inner face of the respective inner race segment and the other end of said plunger extending beyond said sleeve in gauging; and gauging means cooperating between the adjacent plungers responsive to the dimensional relationship between the bearing raceways.

15. A gauging device for measuring the dimensional relationship between the raceways of a double row ball bearing having a split inner race, the device comprising: a base, a gauging assembly comprising coaxially aligned gauging components, three spaced carrying means for carrying the bearing race components in relatively spaced coaxial relationship, the outer race in the center carrying means and an inner race segment in each outer carrying means, means operatively connected to said carrying means for actuation thereof to carry the bearing components in a direction transverse the axis of the gauging components and to a coaxial relationship therewith for gauging, each outer carrying means including means supporting the respective inner race segment for movement toward the adjacent face of the outer race, said gauging components comprising spacing members, one disposed between each inner race segment and the adjacent face of the outer race and each including contact means for engagement with the raceway of an inner race segment and the cooperating raceway of the outer race, means for actuating the inner race segment supporting means to move the inner race segments inward toward the outer race to limited inward positions, and gauging means in said gauging assembly cooperating between the inner race segments and responsive to the displacement therebetween when the bearing components are so spaced.

16. A gauging device for measuring dimensional characteristics of double row ball bearing components having raceways with nominal intersecting contact angles, comprising component locating means, gauging means for measuring dimensional characteristics to be gaged, said gauging means having gaging contact sets for each raceway, each set including a plurality of freely rotatable raceway engaging balls relatively disposed in annular relationship for engagement with one of the raceways and means providing an inclined cam surface at the side of the balls remote from the respective raceway for camming the balls into positioning engagement therewith, means supporting each contact set for relative axial movement toward and from engagement with the respective raceway, and retaining means in association with the opposite sides of the balls of each contact set for retaining the balls when clear of the raceway and releasing said balls for positioning engagement with the respective raceway.

17. A gauging device for measuring dimensional characteristics of double row ball bearing components having raceways with nominal intersecting contact angles, comprising component locating means, gauging means for measuring dimensional characteristics to be gaged, said gauging means having gaging contact sets for each raceway, each set including a full row of freely rotatable raceway engaging balls relatively disposed in contiguous annular relationship for engagement with one of the raceways and means providing a fully annular inclined cam surface at the side of the balls remote from the respective raceway for camming the balls into positioning engagement therewith, means supporting each contact set for relative axial movement toward and from engagement with the respective raceway, and retaining means providing a full annular retaining surface opposing said cam surface and in association with the opposite sides of the balls of each contact set for retaining the balls when clear of the raceway and releasing said balls for positioning engagement with the respective raceway.

References Cited in the file of this patent

UNITED STATES PATENTS

| | | |
|---|---|---|
| 1,946,924 | Allen | Feb. 13, 1934 |
| 2,222,605 | Carlson | Nov. 26, 1940 |
| 2,255,626 | Ortegren | Sept. 9, 1941 |

(Other references on following page)

UNITED STATES PATENTS

| | | |
|---|---|---|
| 2,381,491 | Emmerton | Aug. 7, 1945 |
| 2,448,653 | Aller | Sept. 7, 1948 |
| 2,457,401 | Rupley | Dec. 28, 1948 |
| 2,514,847 | Coroniti | July 11, 1950 |
| 2,594,077 | Schulze | Apr. 22, 1952 |
| 2,643,766 | Nordquist | June 30, 1953 |
| 2,665,496 | Wynne | Jan. 12, 1954 |
| 2,675,621 | Mims | Apr. 20, 1954 |
| 2,675,622 | Aller | Apr. 20, 1954 |
| 2,686,369 | Ongert | Aug. 17, 1954 |
| 2,767,477 | Esken | Oct. 23, 1956 |